United States Patent
Nakajima

(10) Patent No.: US 8,468,173 B2
(45) Date of Patent: Jun. 18, 2013

(54) INFORMATION PROCESSING SYSTEM, INFORMATION PROCESSING METHOD, AND PROGRAM AND STORAGE MEDIUM FOR THE SAME

(75) Inventor: Satoru Nakajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 349 days.

(21) Appl. No.: 11/749,699

(22) Filed: May 16, 2007

(65) Prior Publication Data

US 2008/0046467 A1 Feb. 21, 2008

(30) Foreign Application Priority Data

Jun. 23, 2006 (JP) .................................. 2006-173628

(51) Int. Cl.
*G06F 17/30* (2006.01)
(52) U.S. Cl.
USPC ........................................................ 707/795
(58) Field of Classification Search
USPC ....................... 707/1, 795; 358/474
See application file for complete search history.

(56) References Cited

U.S. PATENT DOCUMENTS

| 7,149,007 | B2* | 12/2006 | Nakaota | 358/474 |
| 2003/0182378 | A1* | 9/2003 | Treptow et al. | 709/206 |
| 2004/0024867 | A1* | 2/2004 | Kjellberg | 709/224 |
| 2005/0111866 | A1* | 5/2005 | Sato | 399/79 |
| 2005/0165742 | A1* | 7/2005 | Chin | 707/3 |
| 2006/0250631 | A1* | 11/2006 | Igarashi | 358/1.13 |

FOREIGN PATENT DOCUMENTS

| JP | 11-119956 A | 4/1999 |
| JP | 2003-122517 A | 4/2003 |
| JP | 2005-297488 A | 10/2005 |

* cited by examiner

*Primary Examiner* — James Trujillo
*Assistant Examiner* — Amresh Singh
(74) *Attorney, Agent, or Firm* — Canon USA, Inc., IP Division

(57) ABSTRACT

Device information identifying a device to which a user has previously instructed execution of processing is acquired from a memory unit configured to store the device information. A device that the acquired device information indicates is requested to send history information including at least information of a history relating to processing having been instructed to be executed in the device by the user. Furthermore, the history information transmitted from the device in response to the request is received. The received history information is displayed on a display.

6 Claims, 14 Drawing Sheets

FIG. 10

| DEVICE INFORMATION TABLE | | |
|---|---|---|
| DATE | DEVICE | PROCESSING CONTENT |
| 2005/09/01 | MFP100D | PRINT |
| 2005/09/15 | MFP100C | SEND |
| 2005/10/20 | MFP100D | PRINT |
| 2005/10/23 | MFP100D | SEND |
| 2005/11/15 | MFP100A | SCAN |
| 2006/01/01 | MFP100C | PRINT |
| 2006/01/31 | MFP100D | SEND |
| 2006/02/10 | MFP100A | SEND |
| 2006/02/12 | MFP100C | SCAN |
| 2006/03/01 | MFP100A | PRINT |
| 2006/04/05 | MFP100A | SCAN |

FIG. 13

DEVICE INFORMATION TABLE

| USER ID 000050 | | | USER ID 022200 | | | USER ID 100500 | | |
|---|---|---|---|---|---|---|---|---|
| DATE | DEVICE | PROCESSING CONTENT | DATE | DEVICE | PROCESSING CONTENT | DATE | DEVICE | PROCESSING CONTENT |
| 2005/09/01 | MFP100D | PRINT | 2005/10/01 | MFP100D | PRINT | 2006/01/06 | MFP100B | SEND |
| 2005/09/15 | MFP100C | SEND | 2005/09/30 | MFP100B | PRINT | 2006/01/06 | MFP100B | SEND |
| 2005/10/20 | MFP100D | PRINT | 2006/01/03 | MFP100A | PRINT | 2006/01/06 | MFP100B | SEND |
| 2005/10/23 | MFP100D | SEND | 2006/01/05 | MFP100A | PRINT | 2006/01/07 | MFP100B | SEND |
| 2005/11/15 | MFP100A | SCAN | 2006/01/10 | MFP100A | PRINT | 2006/01/08 | MFP100B | SEND |
| 2006/01/01 | MFP100C | PRINT | 2006/01/30 | MFP100D | SEND | 2006/01/10 | MFP100B | SEND |
| 2006/01/31 | MFP100D | SEND | 2006/02/10 | MFP100A | PRINT | 2006/01/15 | MFP100B | SEND |
| 2006/02/10 | MFP100A | SEND | 2006/02/20 | MFP100C | PRINT | 2006/01/20 | MFP100B | SEND |
| 2006/02/12 | MFP100C | SCAN | 2006/02/22 | MFP100D | PRINT | 2006/01/20 | MFP100B | SEND |
| 2006/03/01 | MFP100A | PRINT | 2006/02/27 | MFP100A | SCAN | 2006/01/20 | MFP100B | SEND |
| 2006/04/05 | MFP100A | SCAN | 2006/03/02 | | | | | |

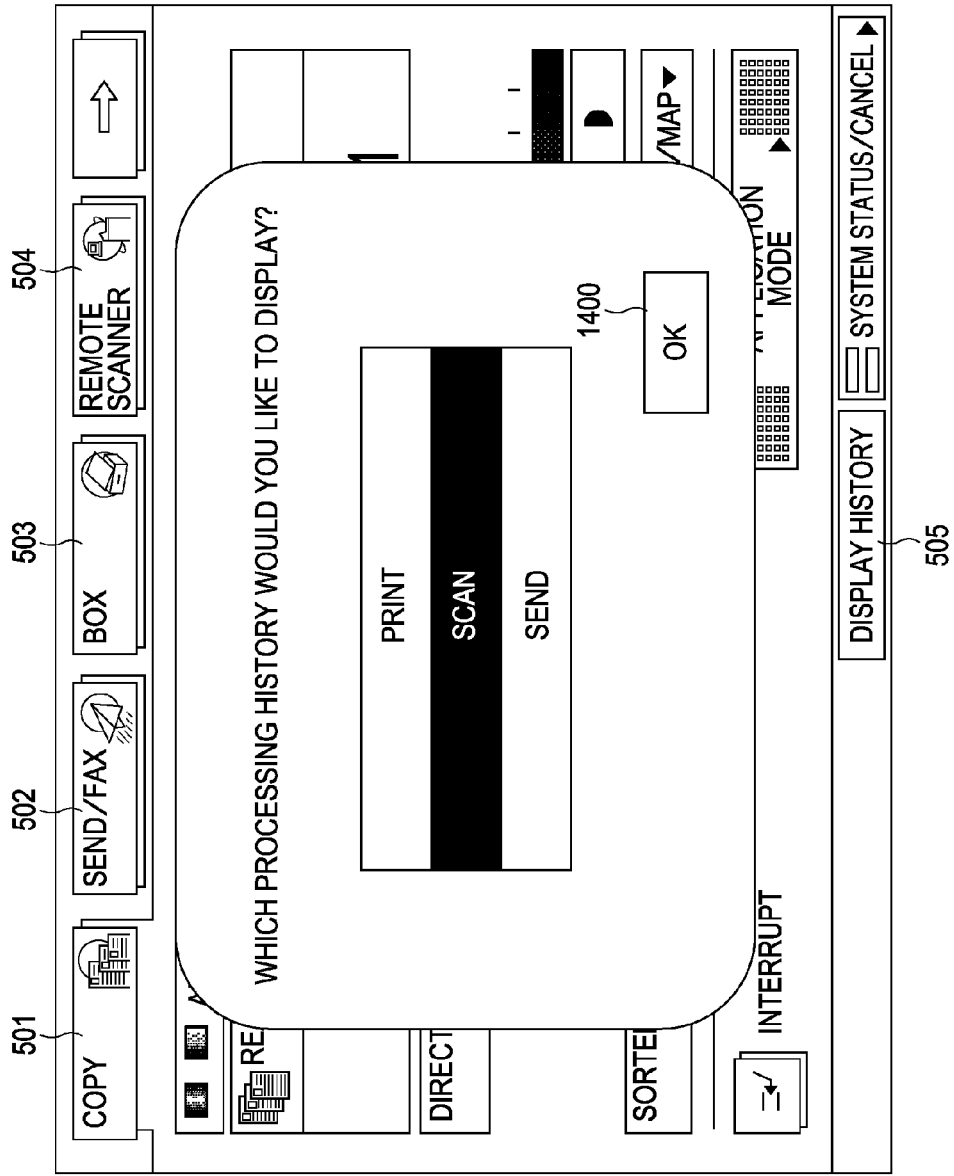

INFORMATION PROCESSING SYSTEM, INFORMATION PROCESSING METHOD, AND PROGRAM AND STORAGE MEDIUM FOR THE SAME

BACKGROUND OF THE INVENTION

1. Field of the Invention

The present invention relates to an information processing system and an information processing method for displaying history information acquired from an external device having executed processing instructed by a user, and a program and a storage medium for the same.

2. Description of the Related Art

Printers for printing images represented by image data, scanners for scanning and inputting images on original documents, and communication devices for sending image data or the like via a network, may manage history information that includes a list of previously executed operations. In particular, multifunction printers (MFPs), into which the above-mentioned printers, scanners, and communication devices are integrated, may manage history information of previously executed operations categorized for each function or for each user who has instructed execution. Referring to the history information of previously executed operations, users can confirm contents of operations previously executed or cause an operation to be re-executed using the same setting as that used in the previous execution.

Meanwhile, a plurality of MFPs may be configured to work in cooperation with each other via a network in some cases. For example, image data obtained by scanning an image from an original document with a scanner of an MFP can be stored in a memory unit included in another MFP on the network. In addition, for example, images represented by image data stored in a memory area of an MFP can be printed by a printer included in another MFP on the network. Furthermore, it is possible to acquire history information of processing executed in another MFP on the network and to display the history information on an operation unit of the MFP acquiring the history information.

In such a case, devices, in response to an execution of an operation requested by a user, may store information regarding types of the executed processing and information regarding a processing target as a processing history entry. Other devices on a network may access a device, whose history information is referred to, to acquire the history information after specifying the device. The acquired history information can be then displayed on a display unit included in each of the other devices. The other devices can re-execute the processing relating to a history information entry selected from the displayed history information (see, for example, Japanese Patent Laid-Open No. 11-119956).

In addition, a device can request transmission of history information corresponding to a user among history information managed in a plurality of other devices on a network and display only the history information relating to the user after integrating the received history information and history information managed therein (see, for example, Japanese Patent Laid-Open No. 2005-297488).

However, the above-described conventional techniques have the following disadvantages. For example, it is necessary to request another device to send the history information to acquire the history information managed by the other device on a network. To make this request, a user is required to input information identifying the device (e.g., an IP (Internet Protocol) address) as described in, for example, Japanese Patent Laid-Open No. 11-119956, which requires some manual work. In particular, to acquire history information from a plurality of external devices, the user has to input information identifying each of the devices, which makes the history information acquiring process cumbersome and non-user-friendly.

Alternatively, it may be possible to transmit a request to all of devices connected to a network, i.e., to broadcast a request to send the history information, when requesting the external devices on the network to send history information. However, in this case, for example, if a user attempts to acquire the history information of processing previously executed by other devices on a network, the request for history information is undesirably transmitted to all devices on the network, including devices that are not relating to the user, i.e., devices that the user has never used. In particular, this disadvantage becomes more serious when many devices are connected to the network, and a network load is undesirably increased every time a user submits a request to acquire the history information.

The present invention is made in view of the above-described disadvantages. According to aspects of the present invention, an information processing system and an information processing method that allows easy acquisition of history information stored in external devices, in which a user has executed processing, without unnecessarily increasing a network load, and a program and a storage medium for the same can be provided.

SUMMARY OF THE INVENTION

Embodiments of The present invention provide an information processing system, an information processing method, and a program and a storage medium for the same, which overcomes or at least mitigate the above-described problems.

According to an aspect of the present invention, a system is provided which includes a memory unit configured to store device information identifying a device to which a user has previously instructed execution of processing, an acquisition unit configured to acquire the device information from the memory unit, a requesting unit configured to request the device identified by the acquired device information to send history information including information relating to processing previously instructed to be executed in the device by the user, a receiving unit configured to receive the history information from the device, and a display unit configured to display the received history information.

Further features and aspects of the present invention will become apparent from the following detailed description of embodiments with reference to the attached drawings.

BRIEF DESCRIPTION OF THE DRAWINGS

The accompanying drawings, which are incorporated in and constitute a part of the specification, illustrate exemplary embodiments of the invention and, together with the description, serve to explain the principle of the invention.

FIG. 10 is a diagram showing a device information table according to an exemplary embodiment of the present invention.

FIG. 13 is a diagram showing a device information table according to an exemplary embodiment of the present invention.

FIG. 14 is a diagram showing a history display instruction screen displayed on a liquid crystal panel according to an exemplary embodiment of the present invention.

DESCRIPTION OF THE EMBODIMENTS

Figure 1:
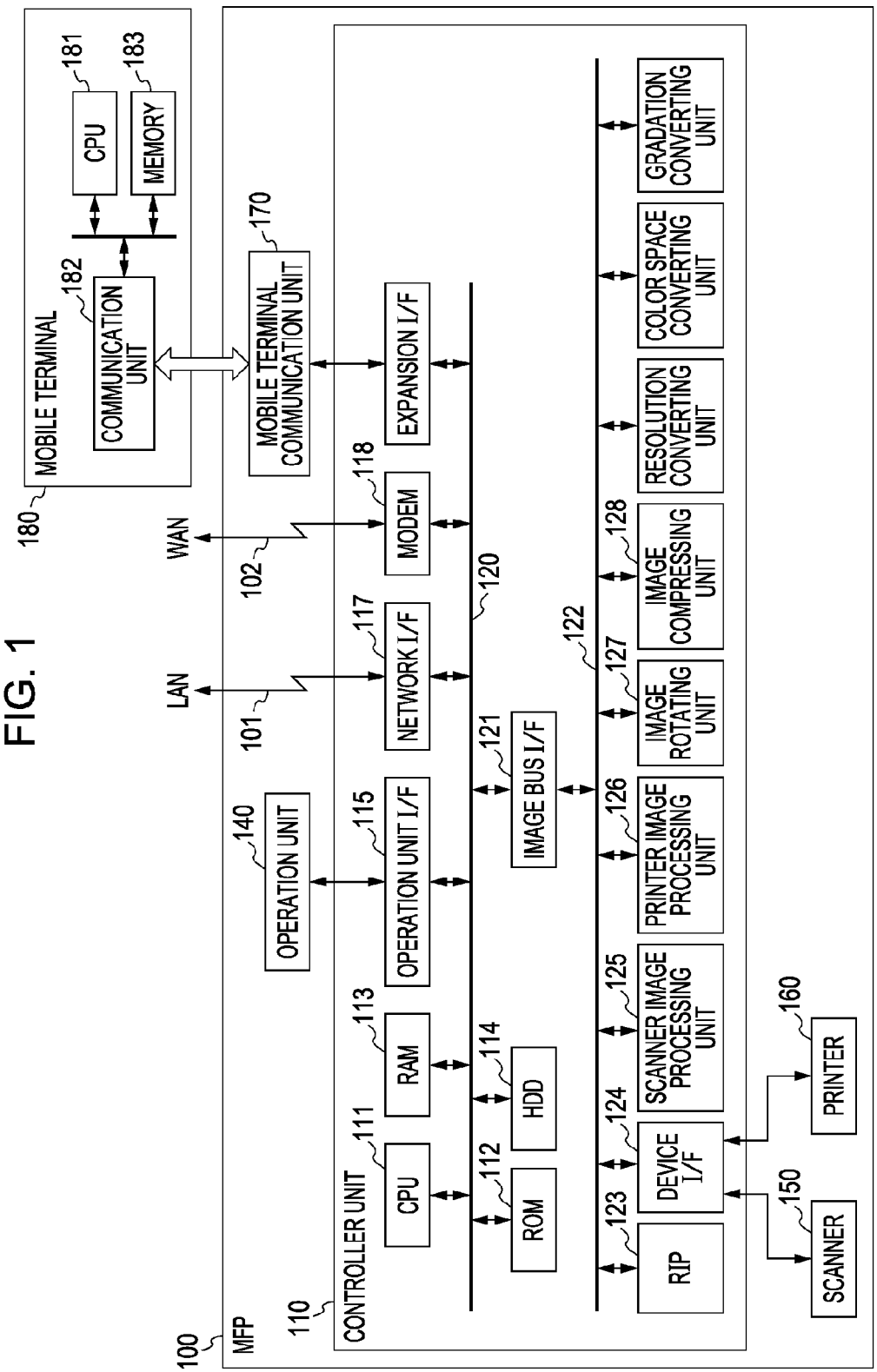
FIG. 1 is a system block diagram of an information processing system according to an exemplary embodiment of the present invention.

Exemplary Embodiments of the present invention will be described below.
First Exemplary Embodiment FIG. 1 is a system block diagram of an information processing system according to a first exemplary embodiment of the present invention. The information processing system according to the first exemplary embodiment includes a multifunction printer (MFP) 100 and a mobile terminal 180. The MFP is a multifunction apparatus, such as a digital multifunction machine.

In the MFP 100, a scanner 150 scans images on original documents and inputs image data corresponding to the scanned images. A printer 160 prints image data to be output on recording media. A controller unit 110 is connected to the scanner 150 and the printer 160. The controller unit 110 controls the scanner 150 or the printer 160, thereby managing input and output of image data. In addition, the controller unit 110 is also connected to a local area network (LAN) 101 and a wide area network (WAN) (i.e., a public line) 102. The controller unit 110 controls transmission and reception of various data and device information.

A central processing unit (CPU) 111 is a controller that controls a system of the MFP 100. A random access memory (RAM) 113 is a system work memory for operations of the CPU 111. The RAM 113 temporarily stores various data and functions as a work area allowing execution of various applications. A read-only memory (ROM) 112 is a boot ROM. The ROM 112 stores a boot program for the system of the MFP 100.

A hard disk drive (HDD) 114 stores system software, various data, various applications, and history information of various operations processed in the MFP 100. Additionally, the HDD 114 stores program codes causing execution of operations shown in flowcharts described later. The CPU 111 loads these program codes to the RAM 113, and performs control operations, shown in the flowcharts described below, on the basis of the program codes.

An operation unit interface (I/F) 115 is an interface to an operation unit 140, which includes a touch panel. The operation unit I/F 115 supplies display data to be displayed on the operation unit 140 to the operation unit 140. In addition, the operation unit I/F 115 transfers instructions input by users through the operation unit 140 to the CPU 111.

A network interface (I/F) 117 is connected to the LAN 101 and receives and transmits various data. A modulator-demodulator (MODEM) 118 is connected to the WAN (i.e., a public line) 102 and receives and transmits facsimile data. The above-described each unit is provided on a system bus 120.

An image bus interface (I/F) 121 connects the system bus 120 and a bus 122 and serves as a bus bridge for converting data structures. The bus 122 allows high-speed transfer of image data or the like. The bus 122 may be constituted by a peripheral component interconnect (PCI) bus or an Institute of Electrical and Electronic Engineers (IEEE) 1394.

The following devices are provided on the bus 122. A raster image processor (RIP) 123 converts page description language (PDL) codes received from personal computers or the like into bitmap images. A device interface (I/F) 124 connects image input/output devices, such as the scanner 150 and the printer 160, and the controller unit 110.

A scanner image processing unit 125 corrects, processes, and edits image data supplied from the scanner 150. A printer image processing unit 126 performs image correction, resolution conversion, and so forth on image data (i.e., print data) to be output to the printer 160. The image rotating unit 127 performs rotation on images corresponding to image data. An image compressing unit 128 performs compression and decompression operations of image data. More specifically, the image compressing unit 128 compresses multilevel image data into a Joint Picture Experts Group (JPEG) format and bi-level image data into a Joint Bi-level Image Experts Group (JBIG) format, a Modified MR (MMR) format, and a Modified Huffman (MH) format and decompresses the compressed image data.

A mobile terminal communication unit 170 enables data communication between the mobile terminal 180 and the MFP 100. Any suitable communication method, such as Bluetooth, infrared communication, or wireless LAN, can be used for data communication between the MFP 100 and the mobile terminal 180. In addition, the communication can be carried out in a contact or contactless manner.

A CPU 181 in the mobile terminal 180 is a controller that controls a system of the mobile terminal 180. A communication unit 182 performs data communication with the MFP 100 using a communication method, such as that cited above. A memory 183 is capable of storing various data. More specifically, the memory 183 stores device information allowing identification of external devices connected to the MFP 100 via a network, and user information (e.g., a user ID) set in association with each user (detailed description thereof is given later).

Figure 2:
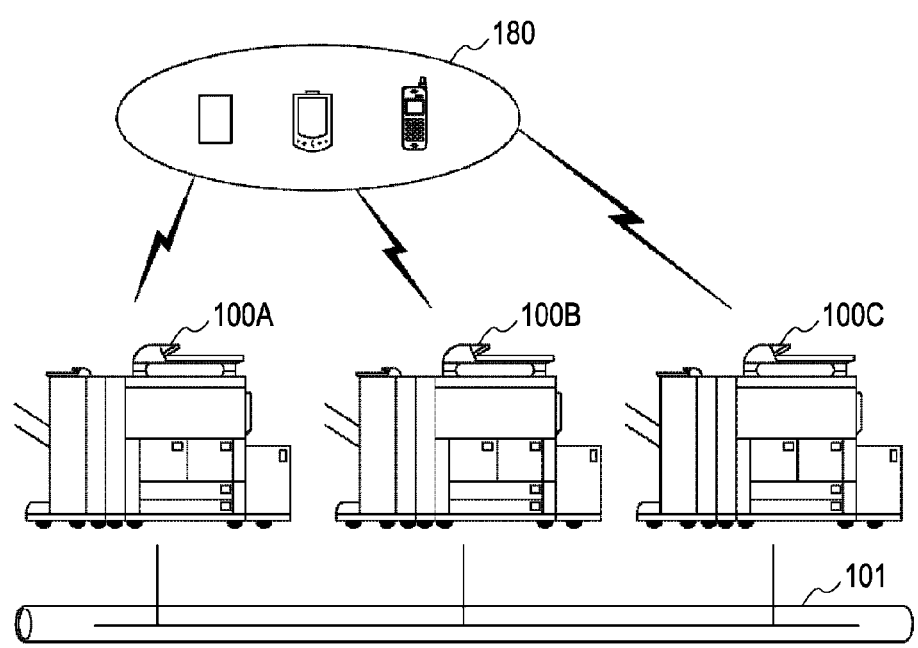
FIG. 2 is a configuration diagram of an information processing system according to an exemplary embodiment of the present invention.

FIG. 2 is a configuration diagram showing an information processing system according to the first exemplary embodiment. Each of MFPs 100A to 100C has the same configurations as the MFP 100 described with reference to FIG. 1. The MFPs 100A to 100C are connected to each other via a network (i.e., the LAN 101). The MFPs 100A to 100C do not have to have all of the above-described configurations of the MFP 100. For example, the MFPs 100A to 100C may be a single-function apparatus having, for example, only a printer or a scanner. The LAN 101 is further connected to the Internet. Thus, each of the MFPs 100A to 100C can perform communication with terminals that reside outside the LAN 101.

The MFPs 100A to 100C can send and receive data to and from each other. For example, image data of images scanned by a scanner included in the MFP 100A can be stored in an HDD included in the MFP 100B. In addition, image data stored in the HDD in the MFP 100B can be printed by a printer included in the MFP 100C. Furthermore, the MFPs 100A to 100C can receive print data from personal computers (not shown) connected to the LAN 101 and print the print data or can send scanned image data to a server (not shown) and store the image data in the server.

As shown in FIG. 2, for example, a mobile phone may be used as the mobile terminal 180. In addition to the mobile phone, various electronic devices, such as, for example, a personal digital assistant (PDA), can be used as the mobile terminal 180. Additionally, the mobile terminal 180 has only to include a storage area for storing information described later. Accordingly, a storage medium, e.g., an integrated circuit (IC) card, not having a control unit, such as a CPU, can be used as the mobile terminal 180. Suppose that a mobile phone is used as the mobile terminal 180 herein. An example employing infrared communication for data communication between the mobile terminal 180 and the MFPs 100A to 100C will be described.

Figure 3:
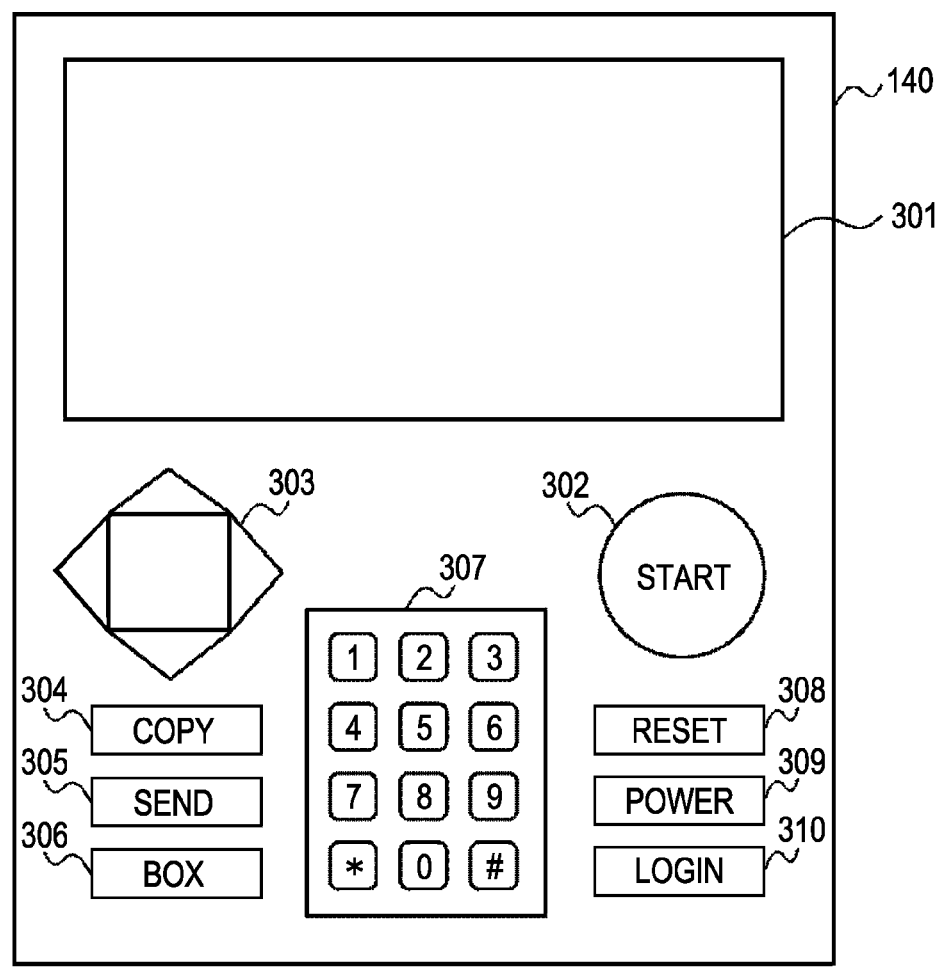
FIG. 3 is a schematic view of an operation unit of an MFP according to an exemplary embodiment of the present invention.

FIG. 3 is a schematic view of the operation unit 140 of an MFP according to an embodiment. A liquid crystal panel 301 displays screens providing user interfaces when users operate the MFP 100. More specifically, the liquid crystal panel 301 displays a preview of image data stored in the RAM 113 or the HDD 114, device information, such as progress of a printing operation in the printer 160, or history information of various operations. In addition, the liquid crystal panel 301 includes a touch panel. The liquid crystal panel 301 detects a position that a user touches, thereby being able to accept various instructions input by the user. The user presses a start button 302 to instruct starting of operations, such as a copy function and a send function.

As other keys, a reset key 308 for resetting various kinds of information set through the liquid crystal panel 301, a power key 309 for tuning ON/OFF the power, and a numeral keypad 307 allowing input of values, such as the number of copies, are provided. Furthermore, a cursor key 303 used for moving a cursor displayed on the liquid crystal panel 301 is provided. Basic modes, such as a copy mode, a send mode, and a box mode, are available in the MFP 100. In the copy mode, image data of images scanned by the scanner 150 is printed by the printer 160. In the send mode, image data is sent via a network. In the box mode, image data is stored in the HDD 114. The operation unit 140 has mode keys 304 to 306 for switching between these modes.

A user presses a login key 310 to perform user authentication before operating the MFP 100. If the login key 310 is pressed while the user has already logged in the system, a logout operation is performed. In the first exemplary embodiment, the login operation is performed by acquiring a user ID stored in the memory 183 of the mobile terminal 180 via infrared communication. Accordingly, the login operation is performed when the login key 310 is pressed with the mobile terminal 180 and the MFP 100 being brought closer to be in a communication-performable range.

Figure 4:
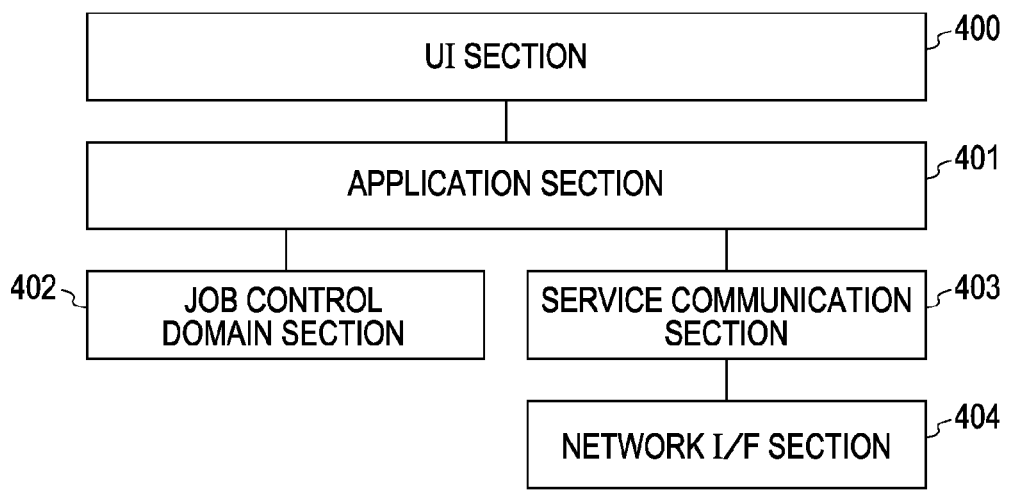
FIG. 4 is a block diagram showing a functional configuration of system software of an MFP according to an exemplary embodiment of the present invention.

FIG. 4 is a block diagram showing a functional configuration of system software in the controller unit 110 of the MFP 100 according to an embodiment. A user interface (UI) section 400 supplies information input by users through the operation unit 140 to an application section 401. In addition, the UI section 400 receives information indicating results of processing performed in the application section 401 or the like and generates display data for screens to be displayed on the operation unit 140.

The application section 401 performs processing in accordance with requests supplied from the UI section 400. If a scanning operation performed by the scanner 150, a printing operation performed by the printer 160, or a sending operation performed through the network I/F unit 117 or the MODEM 118 is requested, a job control domain section 402 reads out specified settings. Furthermore, the application section 401 can receive information indicating a device status and progress of the operation from the job control domain section 402. The job control domain section 402 controls execution of various operations, such as a scan operation, a print operation, and a send operation.

As described later, in the first embodiment, it is possible to acquire history information stored in other devices on a network and display the history information on the operation unit 140 or to read out settings used in the operations included in the history information and perform an operation using the setting. In such a case, after receiving information for requesting history information stored in the external devices from the UI section 400, the application section 401 supplies the request to a service communication section 403.

The service communication section 403 sends a history information request command to another MFP through the network I/F section 404 using simple object access protocol (SOAP) over a hypertext transfer protocol (HTTP) and receives a response to the request. Upon receiving the response, the service communication section 403 transfers the received history information to the application section 401. The network I/F section 404 performs processing using a network protocol, such as a transmission control protocol/internet protocol (TCP/IP).

Figure 5:
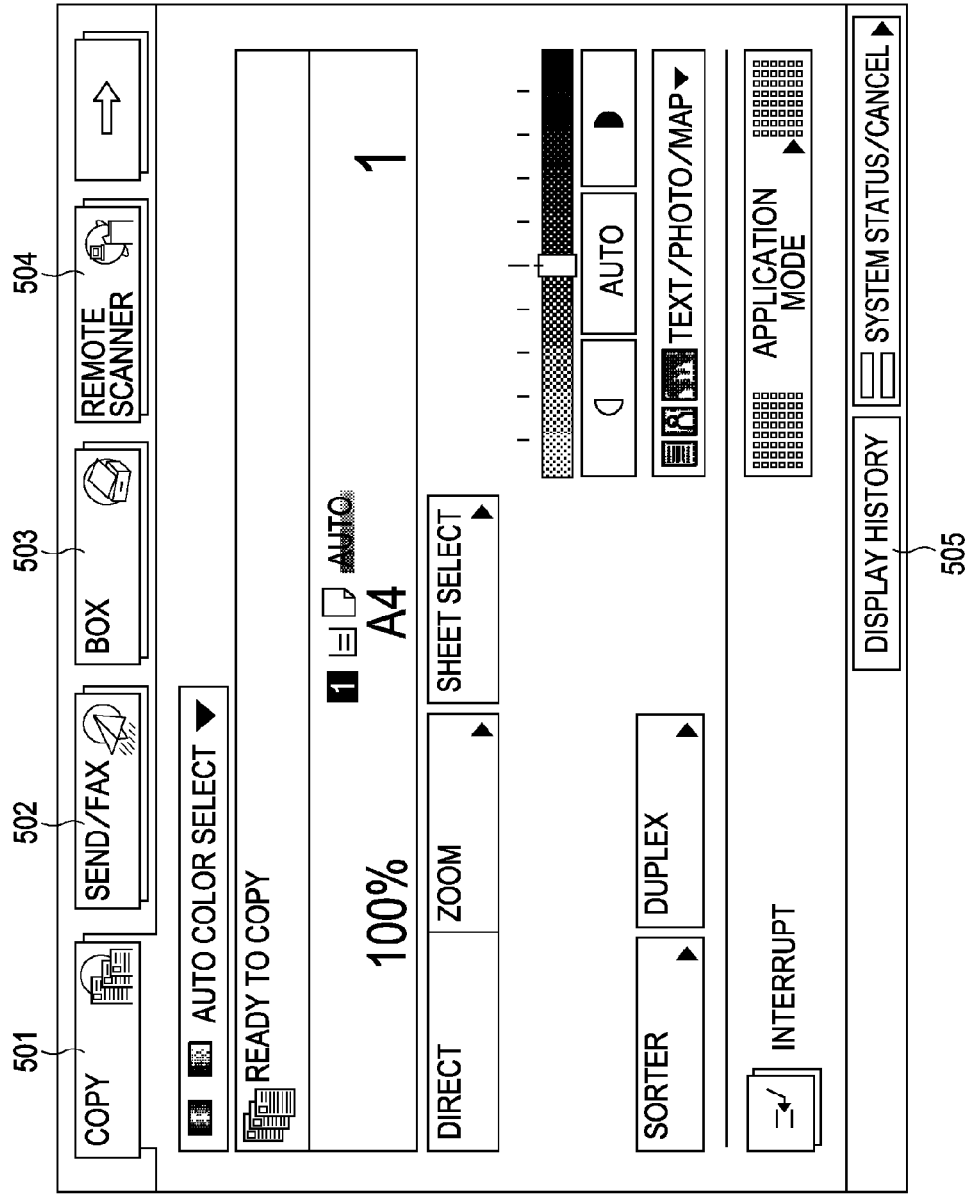
FIG. 5 is a diagram showing a basic screen in a copy mode displayed on a liquid crystal panel of an MFP according to an exemplary embodiment of the present invention.

FIG. 5 shows an example of a screen to be displayed on the liquid crystal panel 301 of the MFP 100 according to an embodiment. The screen shown in FIG. 5 is a basic screen used in the copy mode to be displayed after the completion of user login. To switch the mode to another mode described above, users only have to press one of mode buttons 501 to 504. A history display button 505 displayed at the bottom of the screen is pressed to display history information of operations that a user, currently logging in, has previously executed.

Figure 6:
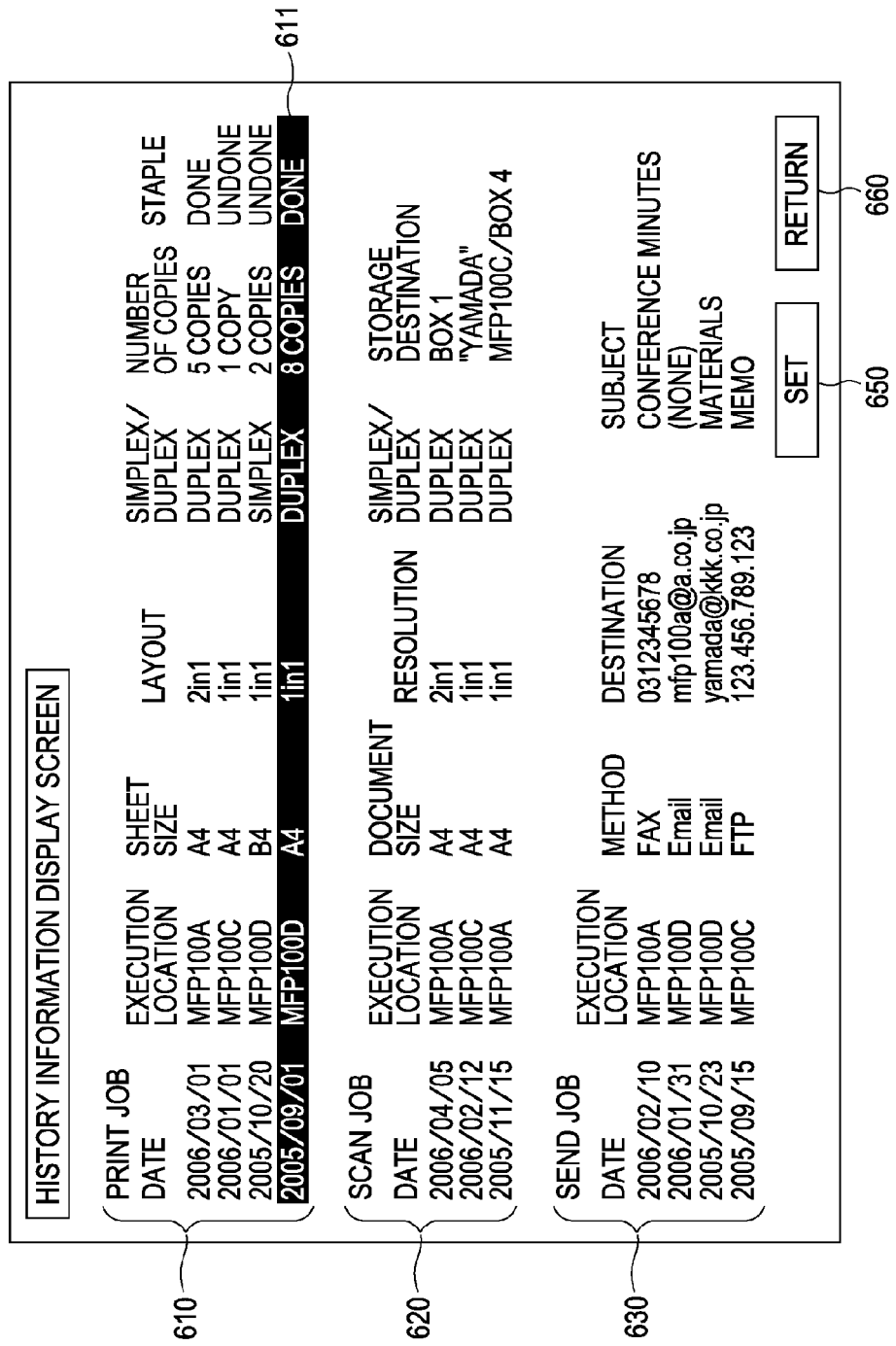
FIG. 6 is a diagram showing a history information display screen displayed on a liquid crystal panel of an MFP according to an exemplary embodiment of the present invention.

FIG. 6 is an exemplary history information display screen to be displayed on the liquid crystal panel 301 of the MFP 100 in response to pressing of the history display button 505, according to an embodiment. This screen displays a list of histories for operations that the user has previously executed in each MFP on the network, including the MFP that the user is currently operating.

An area 610 displays history information of printing operations previously requested to be executed by this user. An item "DATE" represents a starting time of the operations or the time that the user instructed the operations. An item "EXECUTION LOCATION" denotes the MFP operated by the user to instruct the execution of the operations. An item "SHEET SIZE" is information indicating a size of the sheet used in printing. An item "LAYOUT" is information regarding "N in 1 printing". In "N in 1 printing", N (N>0) pages are arranged and printed on one side of one recording medium. For example, "2 in 1" means that two pages are printed on one side of a sheet.

An item "SIMPLEX/DUPLEX" is information indicating whether simplex printing or duplex printing was performed. An item "NUMBER OF COPIES" indicates the number of printed copies. An item "STAPLE" is information indicating whether or not staple processing was performed at the time of printing and discharging the sheet. The item "STAPLE" may indicate information more specifically indicating positions on the sheet where the staple processing was performed and the number of stapled positions. In addition to the item "STAPLE", information regarding other kinds of finishing, such as binding and shifted sheet discharging, may be included.

An area 620 displays history information of scanning operations previously requested to be executed by this user. Items "DATE" and "EXECUTION LOCATION" indicate the same information as in the printing operations described above. An item "DOCUMENT SIZE" indicates the size of scanned original documents. An item "RESOLUTION" indicates a scan resolution set as scan conditions. An item "SIMPLEX/DUPLEX" is information indicating whether only one side was scanned or both sides were scanned when the document was scanned. An item "STORAGE DESTINATION" is information indicating a location where scanned image data is stored. For example, "BOX 1" in a first case means that image data is stored in a storage area, set in the HDD included in this MFP, called "BOX 1". In addition, as shown in a third case, if "MFP 100C/BOX 4" is displayed, image data scanned by an MFP (herein, the MFP 100A) other than the MFP 100C is stored in a storage area, set in the MFP 100C, called "BOX 4".

An area 630 displays history information of send operations previously requested to be executed by this user. Items "DATE" and "EXECUTION LOCATION" indicate the same information as in the printing operations described above. An item "METHOD" is information indicating communication method for use in data transmission among communication methods that each MFP supports, such as faxing, emailing, and FTP (File Transfer Protocol) sending. An item "DESTINATION" is information indicating a destination of data transmission. Depending on the transmission method, the item "DESTINATION" includes a facsimile number, an email address, and an IP (Internet Protocol) address. An item "SUBJECT" is information of a subject of the sent data. For example, in case of emailing, the item "SUBJECT" indicates a file name of an attached file.

As shown in FIG. 6, the history information is categorized by each function and displayed as a list in this example. However, any display method other than this particular example can be employed. For example, the history information of all functions may be collectively displayed after being sorted by the operation execution date or by the item "EXECUTION LOCATION" of the operations. If there are too many cases to be displayed at once, a scroll bar may be displayed.

To return from this screen to the screen shown in FIG. 5 after confirming the history information, the user presses a return button 660. On the other hand, as described above, on the basis of the history information of the operations having been performed, it is possible to read out the settings used in one of the operations included in the history information and to execute a new operation using the setting in the first exemplary embodiment. In such a case, user can select a desired history information entry by touching an area displaying the desired history on the liquid crystal panel 301, which includes a touch panel. A history information entry 611 is selected and is highlighted among the history information of printing operations displayed at the area 610 in the screen shown in FIG. 6. If a set button 650 is pressed with one of the history information entries being selected, content of the setting used in the operation corresponding to the selected history information entry is read out and set.

Figure 7:
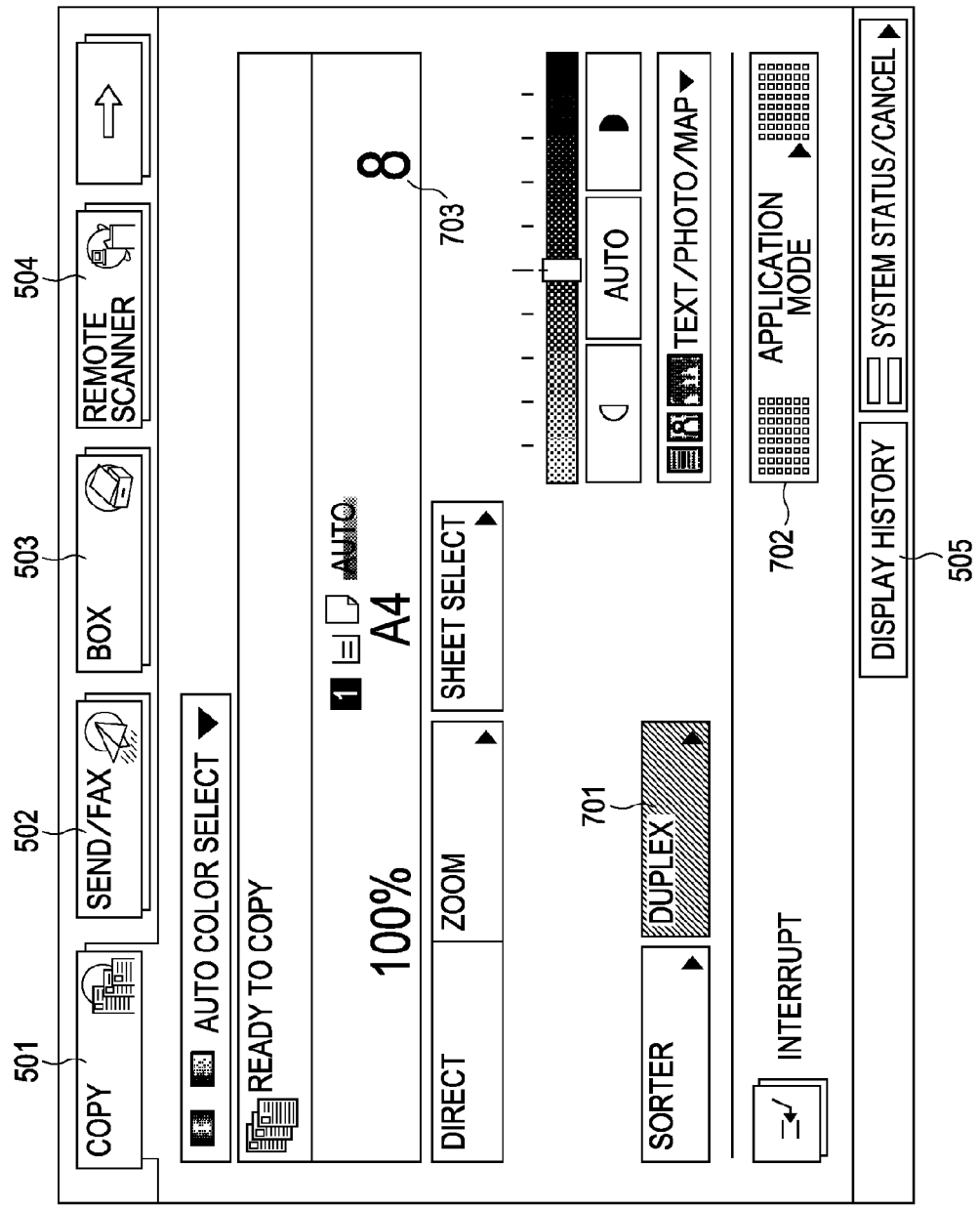
FIG. 7 is a diagram showing a basic screen in a copy mode displayed on a liquid crystal panel of an MFP according to an exemplary embodiment of the present invention.

For example, if the set button 650 is pressed on a screen shown in FIG. 6, a screen shown in FIG. 7 is displayed. FIG. 7 shows a state in which the operation content of the history information entry 611 shown in FIG. 6 is read out and set. Compared with the screen shown in FIG. 5, a duplex printing button 701 is highlighted, on the basis of which it is indicated that duplex printing is selected. In addition, although not displayed on the screen shown in FIG. 7, the staple processing is set in an application mode setting screen to be displayed in response to pressing of an application mode button 702. Furthermore, the illustrated screen indicates that eight copies are specified in a field indicating a number of copies 703.

As mentioned above, FIGS. 8 and 9 show flowcharts more specifically illustrating an operation for acquiring history information of operations that a logged-in user has previously instructed from another MFP on a network and displaying the history information. The CPU 111 of the MFP 100 controls a series of processing steps in these flowcharts by reading out and executing programs stored in the RAM 113. Meanwhile, herein, suppose that the user is operating the MFP 100A shown in FIG. 2, and an MFP 100D is also connected to the network in addition to the MFPs 100A to 100C.

Figure 8:
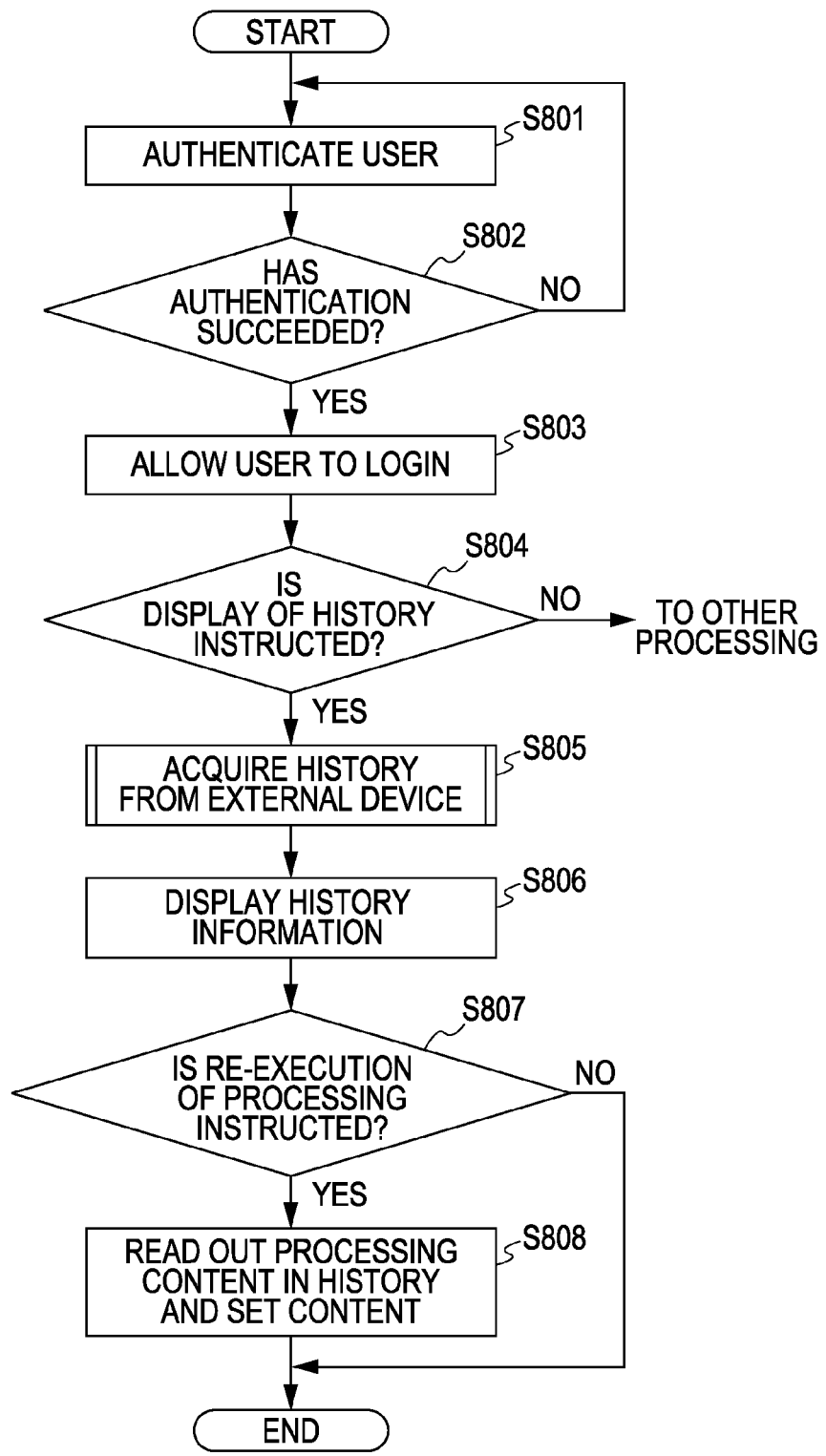
FIG. 8 is a flowchart showing an operation of an MFP according to an exemplary embodiment of the present invention.

FIG. 8 is a flowchart showing an operation performed by an MFP for displaying of the history information after user login and reading out of content of the setting used in the operations that the user has previously instructed. Firstly, at STEP S801, user authentication is performed. This user authentication is performed by reading out user information (e.g., a user ID), which is set in association with each user, stored in the memory 183 of the mobile terminal 180. The user ID read out from the mobile terminal 180 may be compared with user IDs preregistered in the HDD 114 of the MFP 100A. Alternatively, an authentication server storing information for use in the user authentication may be separately connected to the MFP 100A via the network.

At STEP S802, whether or not the user authentication has succeeded is then determined. More specifically, the MFP 100A determines whether or not the user attempting to log in is permitted to operate the MFP 100A. If the authentication results in a success, the MFP 100A allows the user to log in at STEP S803. On the other hand, if the authentication results in a failure, the process returns to STEP S801. At STEP S801, the user authentication is re-executed.

Here, the user ID does not have to be preregistered in the MFP 100A or in the authentication server on the network as describe above. For example, an IP address or an ID of the mobile terminal 180 may be used as the user ID. In such a case, processing performed at STEPs S801 and S802 can be omitted.

At STEP S804, it is determined whether or not an instruction for displaying of history information is received from the user. More specifically, the MFP 100A determines whether or not the user has pressed the history display button 505 on the screen shown in FIG. 5. If displaying of the history information is instructed (YES at STEP S804), the process proceeds to STEP S805. At STEP S805, the MFP 100A acquires, from external devices on the network, the history information of operations that have been executed in the external devices.

At STEP S806, the MFP 100A integrates the history information acquired from the external devices at STEP S805 and history information, stored in the HDD 114 of the MFP 100A, of operations having been executed in the MFP 100A. The MFP 100A then displays the integrated history information on the liquid crystal panel 301.

Then, at STEP S807, it is determined whether or not to perform an operation using the setting used in the operation corresponding to one of the history information entries in the displayed history information, i.e., whether or not to re-execute the operation corresponding to the history information entry. More specifically, if the set button 650 is pressed on the history information display screen shown in FIG. 6, the process proceeds to STEP S808. On the other hand, if the return button 660 is pressed, processing at STEP S808 is skipped and the operation is terminated.

At STEP S808, the MFP 100A reads out the content of the setting used in the operation corresponding to the selected history information entry and displays a screen showing the setting (e.g., the screen shown in FIG. 7). This is the end of the description of the flowchart regarding displaying of the history information. However, for example, if the user further presses the start key 302, an operation corresponding to the content displayed at STEP S808 can be executed. In addition, the setting displayed on the screen shown in FIG. 7 may be partially edited. More specifically, on the screen shown in FIG. 7, the number of copies is set to "8" as a result of the setting based on the history information. After changing this item to "10", the operation can be executed by pressing the start key 302.

Figure 9:
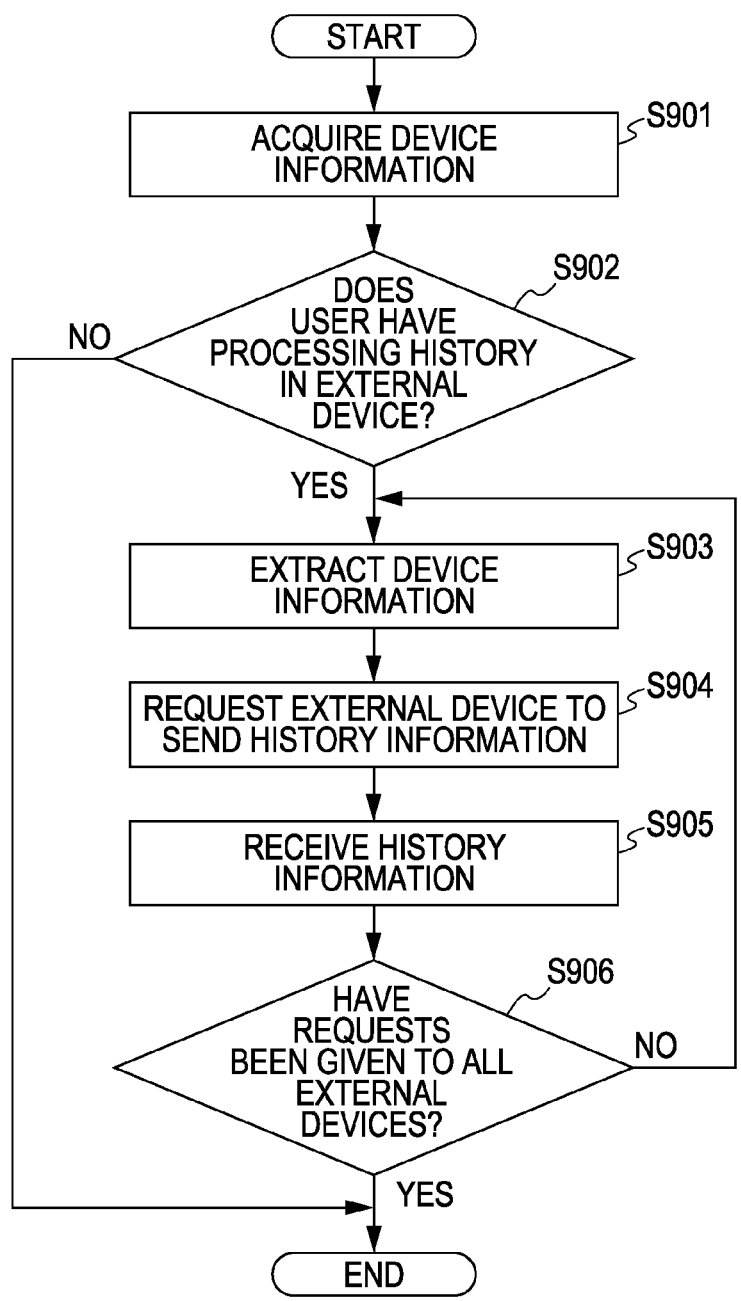
FIG. 9 is a flowchart showing an operation of an MFP according to an exemplary embodiment of the present invention.

FIG. 9 is a flowchart more specifically illustrating the processing performed at STEP S805 in the flowchart shown in FIG. 8. If displaying of the history information is instructed at STEP S804, the MFP 100A acquires device information from the mobile terminal 180 at STEP S901.

Now, FIG. 10 shows a device information table stored in the memory 183 of the mobile terminal 180. The device information table contains information indicating "DATE" that the operation has been performed, "DEVICE" that has executed the operation, and "CONTENT" of the operation. Device IDs, such as the MFP 100A and the MFP 100B, are used as information identifying the "DEVICE" herein. However, instead of these IDs, IP addresses may be used. In an embodiment, each of the MFPs 100A to 100C notifies the mobile terminal 180 of the above-described information regarding the operation, every time the MFP executes some kinds of operation. Upon receiving the operation execution notification from the MFPs 100A to 100C, the mobile terminal 180 adds the information to the device information table to update the table.

At STEP S901, the MFP 100A acquires information, shown in FIG. 10, from the mobile terminal 180 used at the time of user authentication performed at STEP S801. In the first exemplary example, only information identifying the device shown in the "DEVICE" column of the device information table has to be acquired at this time. In addition, the device information acquired at STEP S901 may be obtained together with the user ID at STEP S801.

Next, at STEP S902, it is determined whether or not the user has previously executed operations in an external device. In the example shown in FIG. 10, the table indicates that the user has previously operated the MFPs 100C and 100D in addition to the MFP 100A that the user is currently operating. Accordingly, in the case illustrated in FIG. 10, the process will proceeds to STEP S903.

At STEP S903, the MFP 100A extracts device information for one of devices (e.g., the MFP 100C) from the acquired device information. The MFP 100A then requests the device to send the history information of operations previously executed therein. In this case, the MFP 100A sends the user ID for the user currently logged in together with the request to send the history information so as to request the device to send only the history information corresponding to the user. Alternatively, the user ID does not have to be sent at the time of requesting the transmission of the history information. The MFP 100A may extract only history information entries corresponding to the user ID of the user currently logged in from history information sent from the external device.

At STEP S905, the MFP 100A receives the history information sent from the external device that the MFP 100A has requested to send the history information. At subsequent STEP S906, the MFP 100A determines whether or not transmission of history information is requested to all of the external devices indicated by the device information acquired at STEP S901. In this case, since the request is not given to the MFP 100D, the process returns to STEP S903, and the request is given to the MFP 100D.

If the MFP 100A determines that the history information request has been transmitted to all of the external devices indicated by the device information at STEP S906, the processing shown in FIG. 9 is terminated, and the process proceeds to STEP S806 of the flowchart shown in FIG. 8.

As described above, according to an embodiment, device information identifying external devices to which the user has previously instructed execution of operations is stored in the memory 183 of the mobile terminal 180. The MFP 100A acquires the device information. The MFP 100A then requests the external devices (e.g., the MFPs 100C and 100D) identified by the device information to send the history information of the operations previously executed in the external devices. The MFP 100A receives the history information sent from the external devices and displays the history information on the liquid crystal panel 301. This configuration frees users from the necessity of inputting information identifying the external devices (e.g., IP addresses) to which the transmission of the history information is requested. Furthermore, the transmission of the history information is not requested to all of the external devices on the network but only to those to which the user has previously instructed the execution of the operation (i.e., the request is not given to the MFP 100B). Accordingly, an increase in a network load can be prevented.

Second Exemplary Embodiment

A second exemplary embodiment of the present invention will be described next. Description of configurations similar to those according to the first exemplary embodiment is omitted here. A difference between the second exemplary embodiment and the first exemplary embodiment is that device information is not stored in the mobile terminal 180 as described in the first exemplary embodiment but is stored in a management server on a network.

Figure 11:
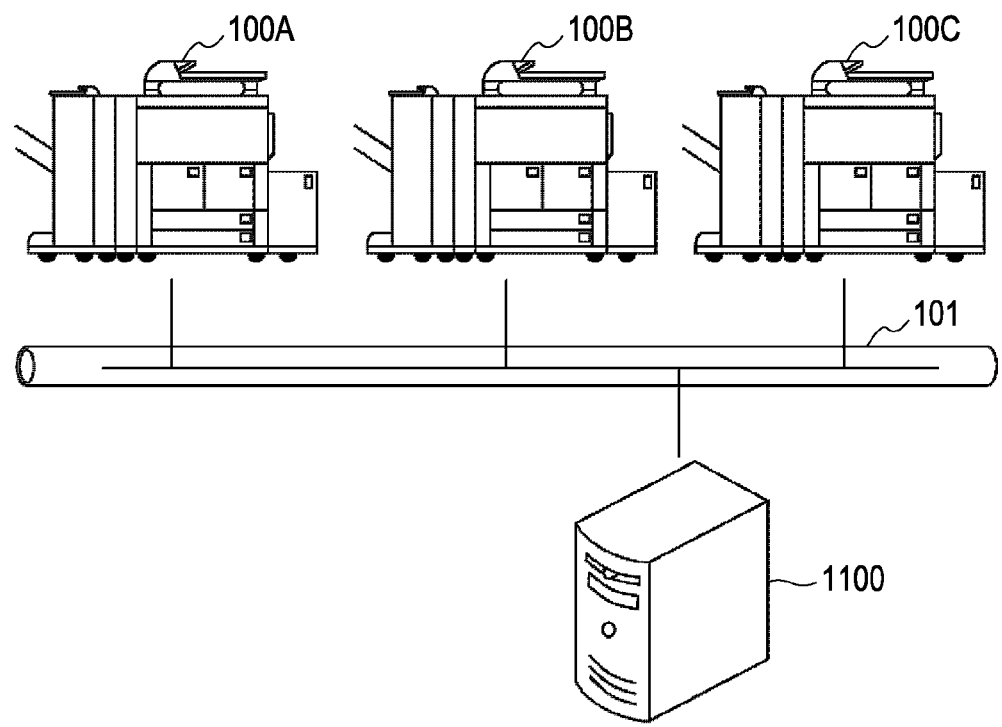
FIG. 11 is a configuration diagram of an information processing system according to an exemplary embodiment of the present invention.

FIG. 11 is a configuration diagram showing an information processing system according to the second exemplary embodiment. MFPs 100A to 100C have the same configurations as those described in the first exemplary embodiment. A management server 1100 is connected to the MFPs 100A to 100C via a network.

Figure 12:
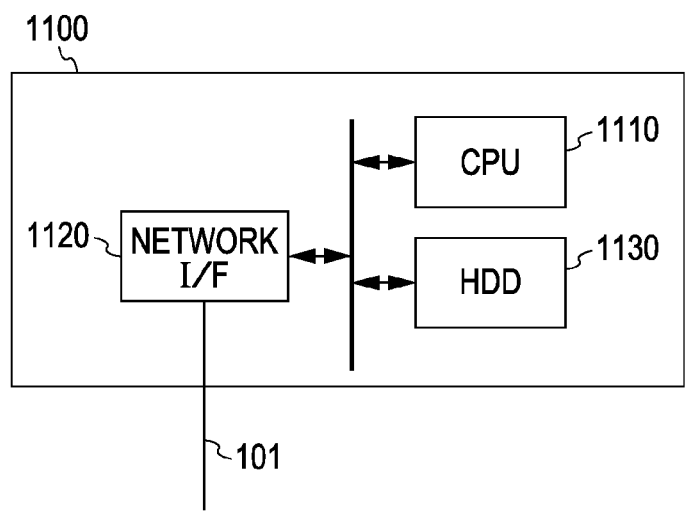
FIG. 12 is a system block diagram of a management server according to an exemplary embodiment of the present invention.

FIG. 12 is a system block diagram of the management server 1100 according to an embodiment. A network interface (I/F) 1120 is connected to a LAN 101 and executes data communication with external devices on the network. An HDD (hard disk drive) 1130 stores various programs for use in controlling the management server 1100 and image data sent from the MFPs 100A to 100C. In addition, the HDD 1130 stores a device information table described below. A CPU 1110 reads out various programs stored in the HDD 1130 or the like and controls the operations performed in the management server 1100.

In the second exemplary embodiment, an operation performed between displaying of the history information after user login and reading out of content of settings used in operations having been executed is similar to that of the flowchart shown in FIG. 8. Thus, only differences will be described here.

Firstly, regarding user authentication performed at STEP S801, a user ID is read out from a mobile terminal 180 in the first exemplary embodiment, whereas the mobile terminal 180 does not have to be used in the second exemplary embodiment. For example, the user ID may be preset using a secret code number and a user may input the secret code number with the keypad 307 shown in FIG. 3 through a liquid crystal panel 301 at STEP S801. The input user ID is verified with user IDs preregistered in the MFP 100A or in an authentication server separately provided on the network. In addition, the management server 1100 may include functions provided by the authentication server. Since the processing performed at steps following STEP S802 of the flowchart shown in FIG. 8 is the same as that performed in the first exemplary embodiment, the description thereof is omitted here.

In the second exemplary embodiment, the flowchart more specifically illustrating the processing performed at STEP S805 of the flowchart shown in FIG. 8 is also similar to the flowchart shown in FIG. 9 in the first exemplary embodiment. Thus, only differences will be described here. At STEP S901 of the flowchart shown in FIG. 9, the device information is acquired from the management server 1100.

FIG. 13 shows a device information table stored in the HDD 1130 of the management server 1100. A difference between this device information table and the device information table shown in FIG. 10 is that, in the table shown in FIG. 13, a plurality of user IDs are managed and information regarding operations having been executed is classified and stored for each user ID.

In addition, the MFPs 100A to 100C according to the second exemplary embodiment notify the management server 1100 of information, such as "DATE", "DEVICE", and "PROCESSING CONTENT" together with the user ID of the user having instructed the execution of the operation every time the MFPs execute some kinds of operation. Upon receiving the information, the management server 1100 updates the device information table.

As described above, according to the second exemplary embodiment, the HDD 1130 of the management server 1100 stores the device information identifying the external devices to which the user has previously instructed execution of the operations. The MFP 100A acquires the device information. The MFP 100A then requests the external devices (e.g., the MFPs 100C and 100D) identified by the device information to send the history information of the operations having been executed in the external devices. The MFP 100A receives the history information sent from the external devices and displays the history information on the liquid crystal panel 301. This frees users from the necessity of inputting information identifying the external devices (e.g., IP addresses) to which the transmission of the history information is requested. Furthermore, the transmission of the history information is not requested to all of the external devices on the network but only to those to which the user has previously instructed the execution of the operations (i.e., the request is not given to the MFP 100B). Accordingly, an increase in a network load can be prevented. In addition, users do not have to carry mobile terminals for storing the device information, which further improves the usability.

Third Exemplary Embodiment

A third exemplary embodiment of the present invention will be described next. Description of configurations similar to those according to the first exemplary embodiment is omitted here. A difference between the third exemplary embodiment and the first exemplary embodiment is that transmission of history information is requested after identifying external devices to which a user has previously instructed execution of the same kinds of operations as that the user attempts to execute.

In the third exemplary embodiment, if a user presses a history display button 505 displayed on a screen shown in FIG. 5, a screen shown in FIG. 14 is displayed. This screen prompts the user to input which operation history information to be displayed. The user can select a desired kind of operation by touching an area displaying the desired kind of operation on a liquid crystal panel 301, which includes a touch panel. In the screen shown in FIG. 14, it is known that "SCAN" is selected since "SCAN" is highlighted. In addition, at this time, the user can select not only one kind of operation but also a plurality of kinds of operation.

If the user presses an OK button 1400 with at least one kind of operation being selected, a history information display screen is displayed. For example, if the OK button 1400 is pressed in a state shown in FIG. 14, only an area 620 for "SCAN JOB" in the history information display screen shown in FIG. 6 is displayed.

In the third exemplary embodiment, an operation performed between displaying of the history information after user login and reading out of content of settings used in previously executed operations is the same as that of the flowchart shown in FIG. 8. Thus, the description thereof is omitted here.

Figure 15:
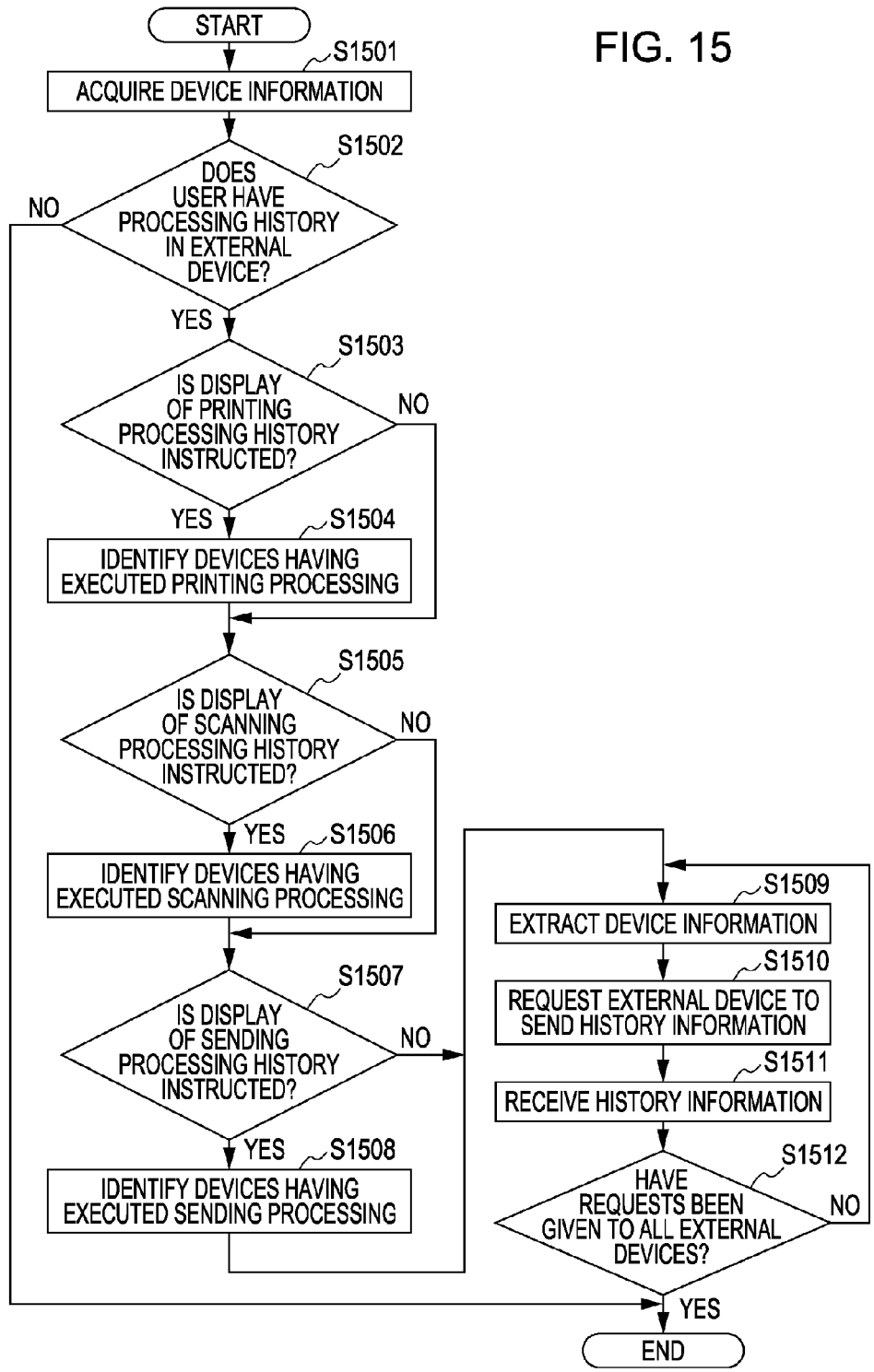
FIG. 15 is a flowchart showing an operation according to an exemplary embodiment of the present invention.

FIG. 15 is a flowchart more specifically illustrating processing performed at STEP S805 of the flowchart shown in FIG. 8 according to the third exemplary embodiment. If displaying of history information is instructed at STEP S804, an MFP 100A acquires device information from a mobile terminal 180 at STEP S1501. For ease of explanation, a case in which a device information table shown in FIG. 10 is acquired will be described.

Subsequently, at STEP S1502, the MFP 100A determines whether or not this user has previously instructed the external device to execute the operation. For example, to describe the example shown in FIG. 10, it is known that the user has operated the MFPs 100C and 100D in addition to the MFP 100A that the user is currently operating. Thus, in this case, the process proceeds to STEP S1503.

At STEP S1503, the MFP 100A determines whether or not an instruction that the user has input on the screen shown in FIG. 14 is the one to display history information of printing operations. If displaying of the history information of printing operations is instructed, the process proceeds to STEP S1504. The MFP 100A refers to only history information entries regarding the printing operations from the device information table shown in FIG. 10, identifies the devices to which the user has previously instructed the execution of the printing operations, and extracts the device information. If displaying of the history information of printing operations is not instructed from the user at STEP S1503, the processing at STEP S1504 is skipped and the process proceeds to STEP S1505.

At following STEPs S1505 to S1508, the MFP 100A determines whether the user has instructed displaying of history information of scan operations or send operations. If displaying of the history information is instructed, the MFP 100A identifies the devices having executed the operations and extracts the device information.

At STEP S1509, the MFP 100A selects the device information for one of the devices from the extracted device information. The MFP 100A requests the device to send the history information at STEP S1510.

At this time, a user ID for the user currently logging in is sent together with the history information transmission request so as to request the device to send history information corresponding only to the user. Alternatively, the user ID does not have to be sent at the time of requesting the transmission of the history information. The MFP 100A may extract only history information entries corresponding to the user ID of the user currently logging in from the history information sent from the external device.

At STEP S1511, the MFP 100A receives the history information sent from the external device to which the MFP 100A has requested the transmission of the history information. At subsequent STEP S1512, the MFP 100A determines whether or not transmission of history information is requested to all of the external devices indicated by the extracted device information. If the request is not given to all of the target external devices, the process returns to STEP S1509.

At STEP S1512, if the MFP 100A determines that the request is given to all of the external devices indicated by the device information, the processing shown in FIG. 15 is terminated, and the process proceeds to STEP S806 of the flowchart shown in FIG. 8.

As described above, according to the third exemplary embodiment, the external devices to which the user has previously instructed the execution of the operations are identified and the history information is requested to the external devices before the history information of the operations desired by the user is displayed. More specifically, a case where the user instructs displaying of history information relating only to "SCAN" operations will be described with reference to the device information table shown in FIG. 10. Referring to the device information table shown in FIG. 10, the user has instructed the execution of the "SCAN" operations only to the MFPs 100A and 100C. Since the user is currently operating the MFP 100A, it is known that the MFP 100C is only an external device to which the user has instructed the execution of the scan operations. If the operation according to the flowchart shown in FIG. 15 is executed, the history information is not requested to the MFP 100D that has executed only "PRINT" and "SEND" operations when the history information of "SCAN" operation is displayed. Accordingly, a network load can be reduced.

In the foregoing descriptions of the first to third exemplary embodiments, an example in which the history information is requested serially (i.e., a request is not given to a next device until the MFP receives a response from a device) to the external devices has been described. However, the history information may be requested in parallel (i.e., a request is given to a next device without waiting for a response from a device).

In addition, information regarding a file actually used in processing or a storage location of the file may be received together with the history information from the external devices. This enables the same data as that used in the processing having been executed to be printed or sent when re-executing the processing having been executed using the history information.

Other Exemplary Embodiments

While exemplary embodiments of the present invention have been described in detail above, the present invention can be realized as, for example, a system, a device, a method, a program, or a storage medium (a recording medium). More specifically, the exemplary embodiments of the present invention may be applied to a system constituted by a plurality of devices or to an apparatus constituted by a single device.

In addition, in the present invention, software programs (programs corresponding to the flowcharts shown in figures in the exemplary embodiments) realizing functions of the above-described exemplary embodiments are supplied to a system or an apparatus directly or remotely. The functions can be achieved by reading out and executing the supplied program codes by a computer included in the system or the apparatus.

Thus, the program codes installed in the computer to realize the functions of the present invention by the computer also embody the present invention. That is, the computer program for realizing the functions of the present invention is also included in the scope of the present invention.

In such a case, the program may in any form, such as, an object code, a program executed by an interpreter, or script data supplied to an operating system, as long as it has functions of the program.

Types of recording media used for supplying the program include, for example, a floppy disc®, a hard disc, an optical disc such as a CD-ROM, a CD-R, a CD-RW, and a DVD (DVD-ROM or DVD-R), a magneto-optical disc such as an MO, a magnetic tape, a nonvolatile memory card, and a ROM.

Regarding methods for supplying the program, the program may be supplied to a client computer by downloading the program from a Web site on the Internet to a recording medium, such as a hard disk using a browser. That is, the client computer accesses a Web site, and downloads the computer program according to an aspect of the present invention or a compressed file having an automatic installation function from the Web site. In addition, program codes constituting the program according to an aspect of the present invention may be divided into a plurality of files, and each of the plurality of files may be downloaded from different web sites, whereby functions of the present invention can be realized. That is, a World Wide Web server that allows a plurality of users to download the program files for realizing the functions of the present invention by a computer is also included in the present invention.

Additionally, the program according to an aspect of the present invention may be encrypted and stored on a storage medium, such as a CD-ROM, and distributed to users. Only users that satisfy a predetermined condition are allowed to download information of a decryption key from a Web site via the Internet. The encrypted program is executed using the key information and installed in a computer, whereby functions of the present invention can be realized.

Furthermore, the computer executes the read out program, thereby realizing functions of the above-described exemplary embodiments. In addition, an operating system or the like working on the computer may perform some or all of the actual processing operations on the basis of instructions of the program, and the functions of the above-described exemplary embodiments may be realized by the processing operations.

Moreover, the program read out from the recording medium may be written in a memory included in a function expansion board inserted into the computer or a memory included in a function expansion unit connected to the computer, thereby realizing the functions of the above-described exemplary embodiments. That is, on the basis of instructions of the program, a CPU or the like included in the function expansion board or the function expansion unit executes some or all of the processing operations, and the functions of the above-described exemplary embodiments may be realized by the processing operations.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-173628 filed Jun. 23, 2006, which is hereby incorporated by reference herein in its entirety.

What is claimed is:

1. An image processing apparatus for communicating with a portable processing device and a plurality of external devices each having a print function, the image processing apparatus comprising:
   a reading unit configured to read a user identification (ID) from the portable processing device;
   an obtaining unit configured to obtain a device information table from a management server via a network, wherein, in the device information table, apparatuses previously operated in the past by a user are managed for each user;
   a specifying unit configured to specify an external device previously operated by a specific user, which is identified by the read user ID, from among the plurality of external devices, based on the device information table obtained by the obtaining unit;
   a requesting unit configured to request the specified external device to send history information, wherein the history information includes setting information relating to print processing previously instructed to be executed in the specified external device by the specific user;
   a receiving unit configured to receive the history information from the specified external device; and
   a print processing unit configured to perform print processing in accordance with setting information included in the received history information.

2. The image processing apparatus according to claim 1, wherein the requesting unit is configured to notify the specified external device of user information corresponding to the specific user, and request the specified external device to send history information corresponding to the read user ID.

3. The image processing apparatus according to claim 1, wherein the history information includes information indicating at least one of a printed paper size, an N in 1 layout, one-side/both sides, a number of copies, and a type of finishing.

4. The image processing apparatus according to claim 1, further comprising a notification unit configured to notify, in response to print processing being performed by the print processing unit to update the management table, the management server of identification information of the image processing apparatus.

5. The image processing apparatus according to claim 1, further comprising a display unit configured to display the history information received by the receiving unit,
   wherein the print processing unit performs the print processing in accordance with history information selected by the specific user from history information displayed by the display unit.

6. A method for controlling an image processing apparatus for communicating with a portable processing device and a plurality of external devices each having a print function, the method comprising:
   reading a user identification (ID) from the portable processing device;
   obtaining a device information table from a management server via a network, wherein, in the device information table, apparatuses previously operated in the past by a user are managed for each user;
   specifying an external device previously operated by a specific user, which is identified by the read user ID, from among the plurality of external devices, based on the obtained device information table;
   requesting the specified external device to send history information, wherein the history information includes setting information relating to print processing previously instructed to be executed in the specified external device by the specific user;
   receiving the history information from the specified external device; and
   performing print processing in accordance with setting information included in the received history information.

* * * * *